United States Patent
Rayfield et al.

[19]

[11] Patent Number: 5,825,725
[45] Date of Patent: Oct. 20, 1998

[54] METHOD AND APPARATUS FOR REVERSIBLE OPTICAL DATA STORAGE

[75] Inventors: George W. Rayfield; Kuo-Chung Hsu, both of Eugene, Oreg.

[73] Assignee: The State of Oregon acting by and through the State Board of Higher Education on behalf of the University of Oregon, Eugene, Oreg.

[21] Appl. No.: 851,773

[22] Filed: May 6, 1997

[51] Int. Cl.⁶ .................................................. G11B 13/00
[52] U.S. Cl. ............................. 369/14; 365/112; 430/269
[58] Field of Search .............................. 369/14, 126, 121, 369/276; 365/106, 112, 215, 234; 430/19, 21, 269, 270.11, 139, 495.1, 962

[56] References Cited

U.S. PATENT DOCUMENTS

| | | | |
|---|---|---|---|
| 4,458,345 | 7/1984 | Bjorklund et al. | 369/103 |
| 4,969,141 | 11/1990 | Takaoka et al. | 369/100 |
| 5,228,001 | 7/1993 | Birge et al. | 365/215 |
| 5,253,198 | 10/1993 | Birge et al. | 365/106 |
| 5,290,699 | 3/1994 | Oesterhelt et al. | 435/252.3 |
| 5,346,789 | 9/1994 | Lewis et al. | 430/19 |
| 5,470,690 | 11/1995 | Lewis et al. | 430/269 |

FOREIGN PATENT DOCUMENTS

22470/91 of 1991 Japan.

OTHER PUBLICATIONS

Hsu et al., "Reversal of the Surface Charge Asymmetry in Purple Membrane Due to Single Amino Acid Substitutions," 70 *Biophys. J.* 2358 May, 1996.

*Primary Examiner*—Tan Dinh
*Attorney, Agent, or Firm*—Chernoff, Vilhauer McClung & Stenzel, LLP

[57] ABSTRACT

Storage, retrieval and erasure of optical information in bacteriorhodopsin (bR) films by alteration of the bR's absorption spectrum by photo-induction and by application and switching of an electrical field.

23 Claims, 9 Drawing Sheets

METHOD AND APPARATUS FOR REVERSIBLE OPTICAL DATA STORAGE

BACKGROUND OF THE INVENTION

Films of the complex light-sensitive protein bacteriorhodopsin (bR) and mutants thereof have been used for optical information storage and processing. See, for example, U.S. Pat. Nos. 5,290,699 and 5,253,198. However, no previously known method has permitted information stored in the bR film to be read without erasure occurring at the same wavelength used for recording, thereby excluding the possibility of long-term information storage.

SUMMARY OF THE INVENTION

The present invention comprises a method and device for reversible optical information storage with indefinite storage times and with the capability of being read without erasure. Optical information is stored in a bR film by writing with light that has a wavelength within bR's absorption spectrum. After the writing process is complete, the film is switched to a new state to store the information for reading, allowing the stored information to be read without erasure at the same wavelength as that used for writing. Information stored in the film is erased by illumination at another wavelength than that used to write the information. Following erasure, the film may be switched back to the original state for another write, read and erase cycle.

DETAILED DESCRIPTION OF THE PREFERRED EMBODIMENT

The present invention utilizes a bacteriorhodopsin film which is reversibly switched between a purple membrane state that absorbs light at 568 nm (the "BR568 state") and a blue membrane state that absorbs light at 605 nm (the "BR605 state"). This may be accomplished by removing cations and/or lowering the pH of the film but is most preferably accomplished by application of an electrical potential across the film. The electrical potential may vary widely, such as from >0.1 to 1000 V; a preferred voltage range is from 3 to 30 V. If the film in the blue membrane state is illuminated by red light, its absorbance peak is shifted to 500 nm (the "P500 state") and it becomes transparent to the red light thereby creating a "bleaching" effect. This bleaching effect allows optical data in the form of a light-dark pattern or image to be written into the film using red light while the film is in the blue state. After the light-dark pattern is written into the film the film is switched from the blue membrane state to the purple membrane state by again applying an electrical potential across the film, but of reverse polarity relative to that first applied. This "fixes" the light-dark pattern recorded in the film. Now exposure to red light does not alter the light-dark pattern since the film is in the purple membrane state, thereby permitting the light-dark pattern to be read without erasure by the same red light that was used to record the pattern in the BR film. Information stored in the film is erased by illumination of the film with blue light of approximately 400 nm wavelength. The light-dark pattern can be enhanced even more by maintaining the film in darkness for a few hours which permits decay of the P500 state to a "Q390 state" that absorbs light at 390 nm.

The relationship between the various photo- and voltage-induced states and their manipulation according to the present invention are shown below.

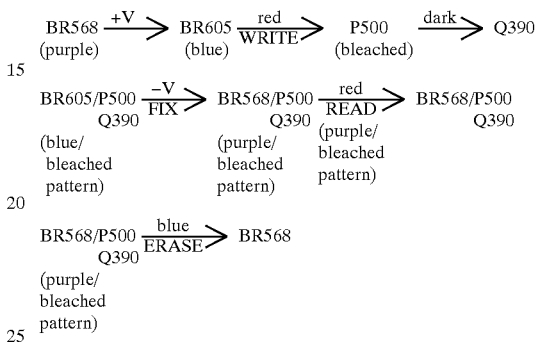

The term "bacteriorhodopsin" is intended to include bacteriorhodopsin itself and mutants thereof, both known and unknown. Exemplary known bR mutants include those disclosed in Soppa et al., "Bacteriorhodopsin Mutants of Halobacterium sp. GRB," 264 *J. Biol. Chem.* 13049 (1989) and those disclosed in U.S. Pat. No. 5,290,699 and in Hsu et al., "Reversal of the Surface Charge Asymmetry in Purple Membrane due to Single Amino Acid Substitutions," 70 *Biophys. J.* 2358 (1996).

The amount of bR or bR mutant present in the film may vary widely, i.e., between $4\times10^{-5}$ and 70 wt %, but is preferably present in an amount between 0.008 and 5 wt %, and most preferably at least 0.001 wt %.

EXAMPLE 1

Figure 1:
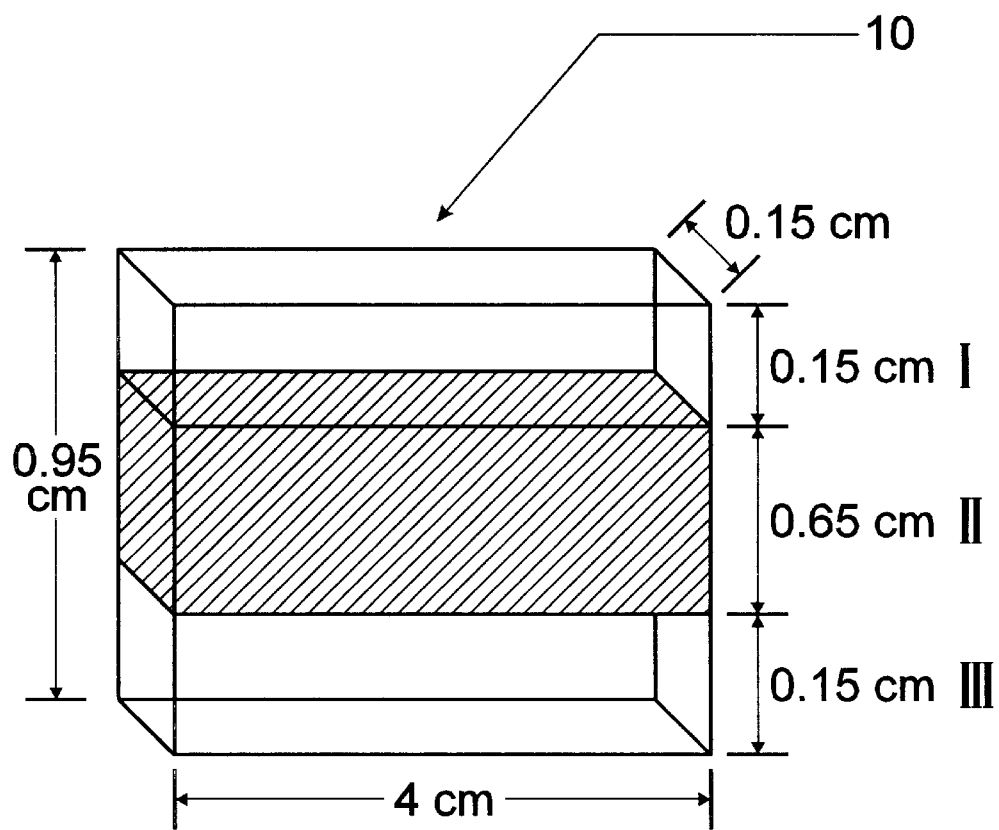
FIG. 1 is an exemplary multi-layer hydrogel incorporating bacteriorhodopsin.

Bacteriorhodopsin in a polymer hydrogel matrix comprising polyacrylamide was prepared and used to demonstrate that optical data may be recorded, fixed, read and erased by the method of the present invention. An optical data recording device comprising a layer of the bR hydrogel between two conductive hydrogel layers was prepared as follows. A hydrogel solution comprising 15 wt % acrylamide, 0.4 wt % N,N'methylene bis-acrylamide, 0.3 wt % ammonia persulfate catalyst and 0.3 wt % N,N,N',N'-tetraamethylethylenediamine catalyst was prepared and divided into two portions, designated solution I and solution II. Bacteriorhodopsin (0.04 wt %) was added to solution II and thoroughly mixed. A rectilinear mold was fabricated with inside dimensions of 4-cm-wide×0.95-cm-high×0.15-cm-thick, and 90 µL of solution I was poured into the mold to form a first layer (layer I) 0.15 cm in height. After polymerization of layer I was complete, 400 µL of solution II, was poured into the mold to form a second layer (layer II) 0.65 cm in height on top of layer I. Following polymerization of layer II, 90 µL of solution I was poured into the container to form a third layer (layer III) 0.15 cm in height on top of layer II. The dimensions of the three-layered polyacrylamide hydrogel 10 were as noted in FIG. 1. Upon completion of polymerization of layer III, the entire laminated gel was removed from the mold and soaked in deionized water for two days, then removed and soaked in 1 mM CaCl$_2$ solution for 24 hours. This gel was cut into four equal three-layered portions having the dimensions 1 cm wide×0.95 cm high×0.15 cm thick.

Figure 2:
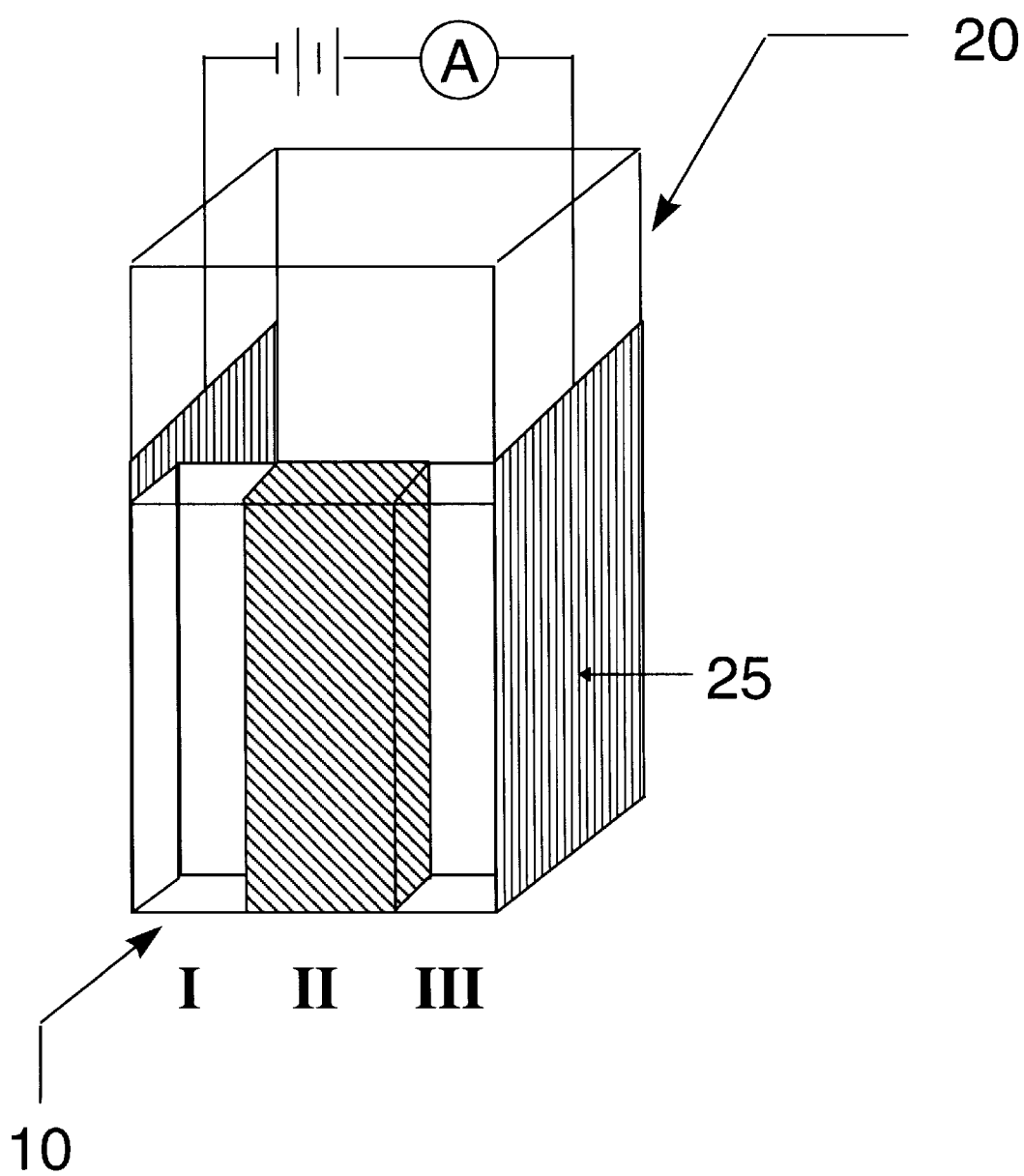
FIG. 2 is a schematic of an exemplary embodiment of the invention utilizing the multi-layer hydrogel shown in FIG. 1.

A test cell 20 was fabricated substantially as shown in FIG. 2 as follows. The three-layered bR polyacrylamide gel 10 was put into a standard spectrophotometer cuvette having inside dimensions of 1 cm×1 cm×4.5 cm. Then platinized platinum electrodes 25 (1 cm×2 cm) were placed in contact with the ends of layers I and III. Finally, these electrodes were connected in series to a DC power supply and an ammeter.

Figure 3:
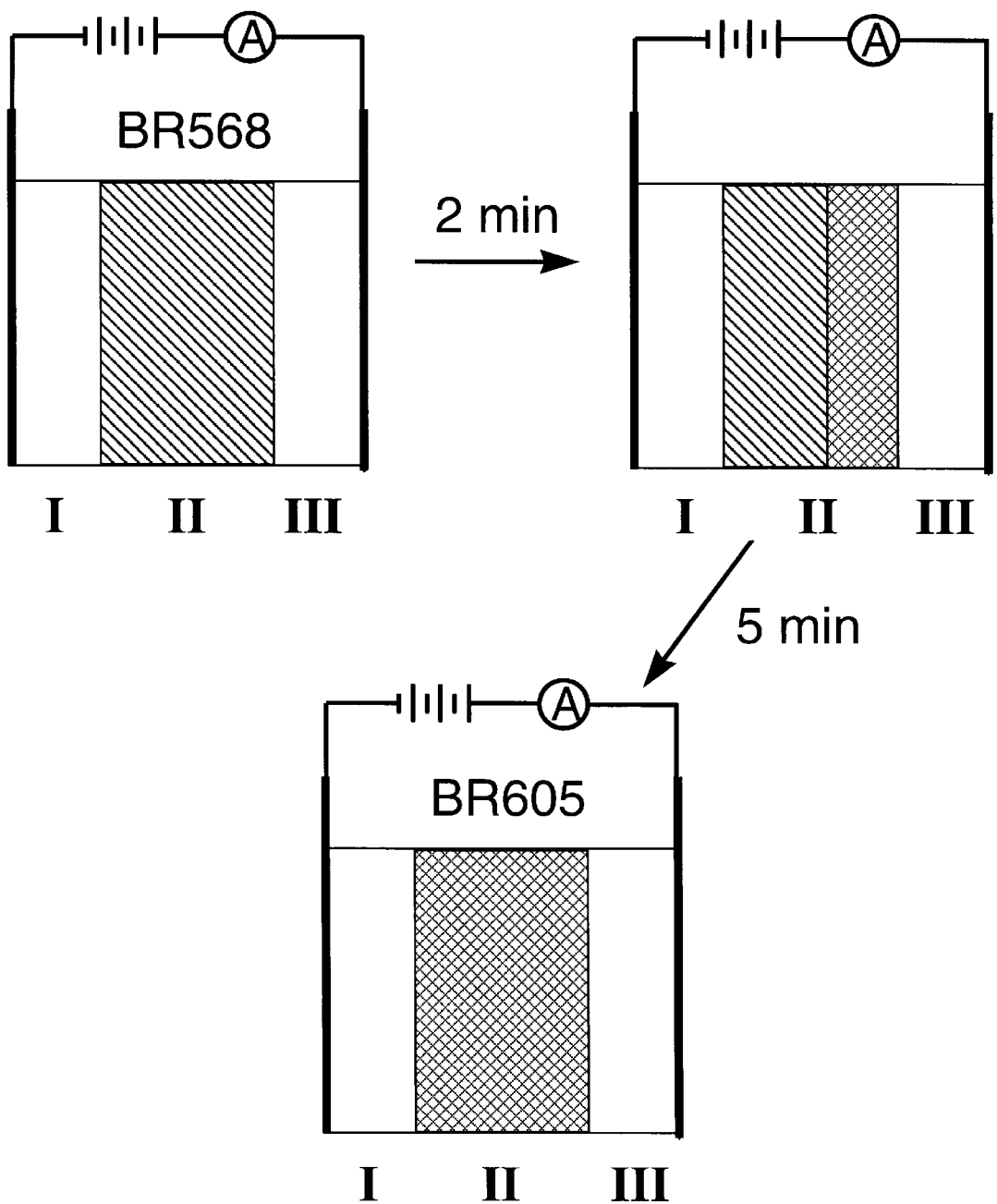
FIG. 3 comprises a series of schematics showing the progressive conversion of the bR in a test cell from the BR568 to the BR605 state by the application of an electrical field thereto.
Figure 4:
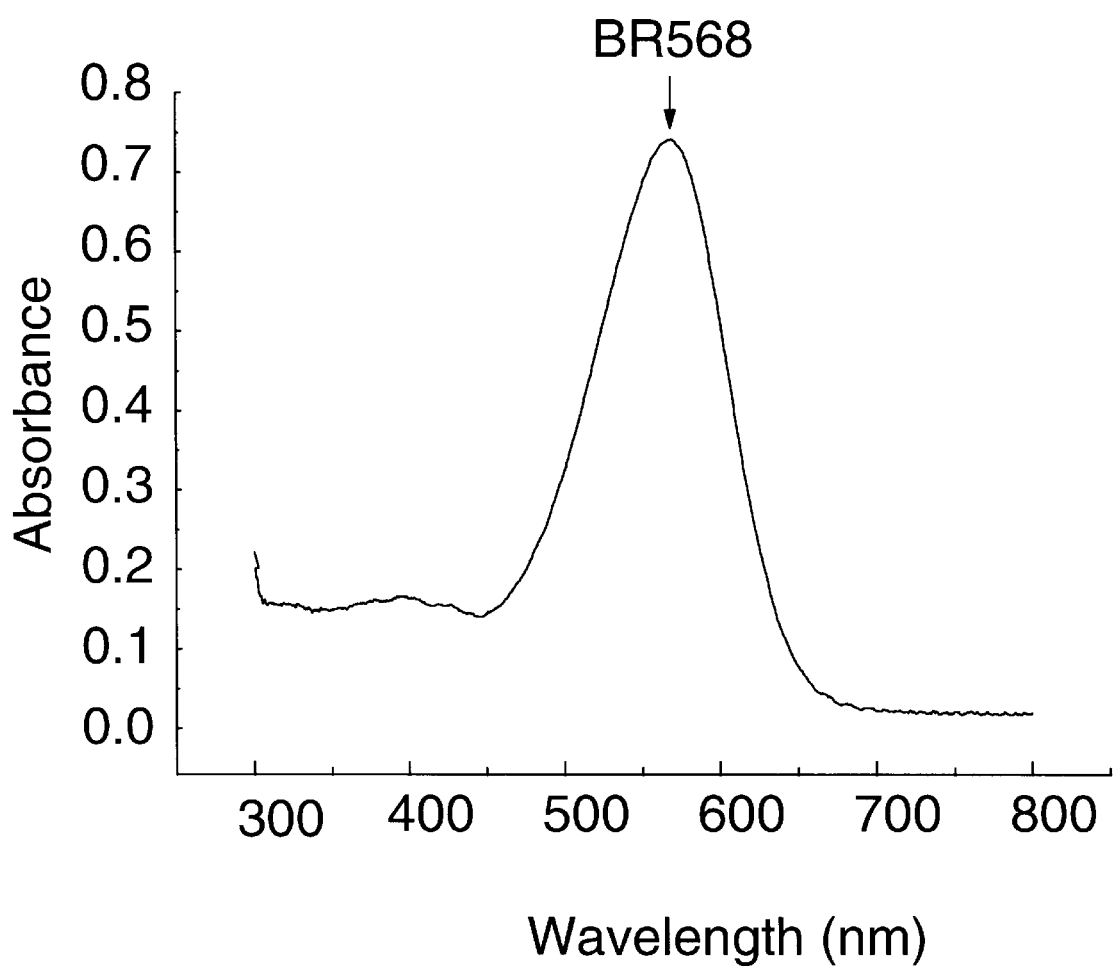
FIGS. 4–9 are graphs showing the absorption spectra of various induced states of the bR in a test cell.
Figure 5:
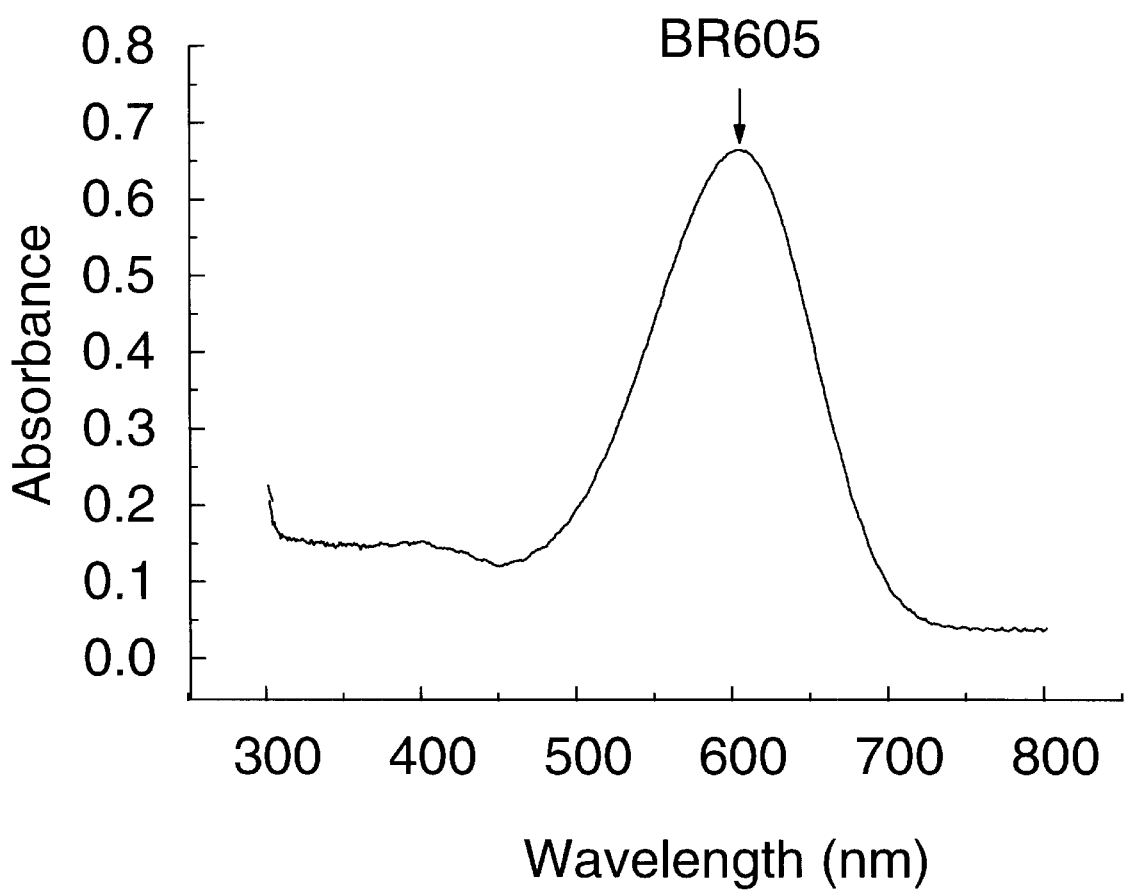

Reversible electric field switching between the BR568 state and the BR605 state was demonstrated as follows: before the DC voltage was turned on, the bR molecules in layer II were in the purple BR568 state, the absorption spectrum of which is shown in FIG. 4. Applying a DC voltage of 20 V at 0.6 mA to the cell caused the bR gel (layer II) to turn blue beginning at the positive side (anode). As shown schematically in FIG. 3, the entire bR gel (layer II) turned blue (indicated by double cross-hatching) in about five minutes at 23° C., demonstrating that the bR molecules in layer II were converted from the BR568 state to the BR605 state. The absorption spectrum for this shift in states is shown in FIG. 5. The BR605 state generated by the application of voltage exhibited the same absorption spectrum and photochemistry as the BR568 to BR605 shift known to be induced by cation removal or lowering the pH.

Reversing the polarity of the DC power caused the bR gel (layer II) to turn back to purple and required about five minutes at 23° C., demonstrating that the bR molecules in layer II were converted from the BR605 state back to the BR568 state. It was observed that the conversion back to the BR568 state from the BR605 state by this electric field switching was identical to the known BR605 to BR568 conversion caused by cation addition or raising pH.

Figure 6:
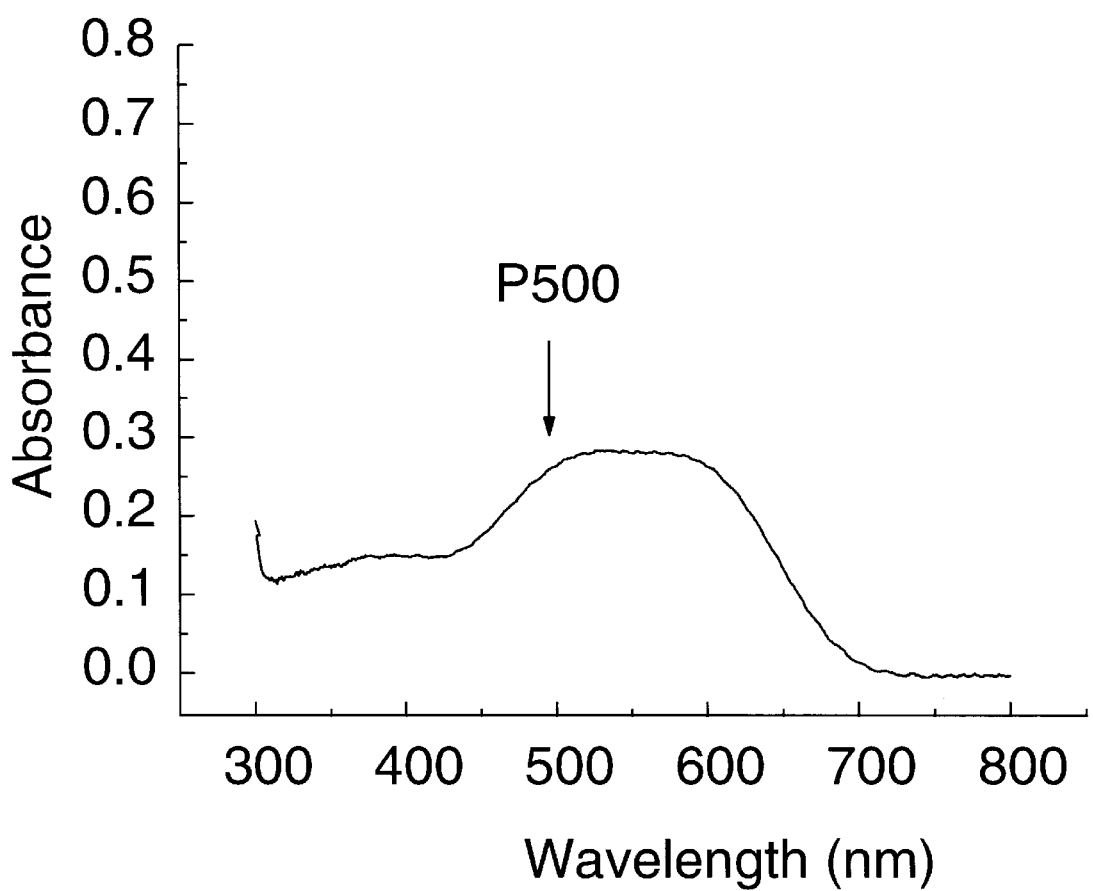
Figure 7:
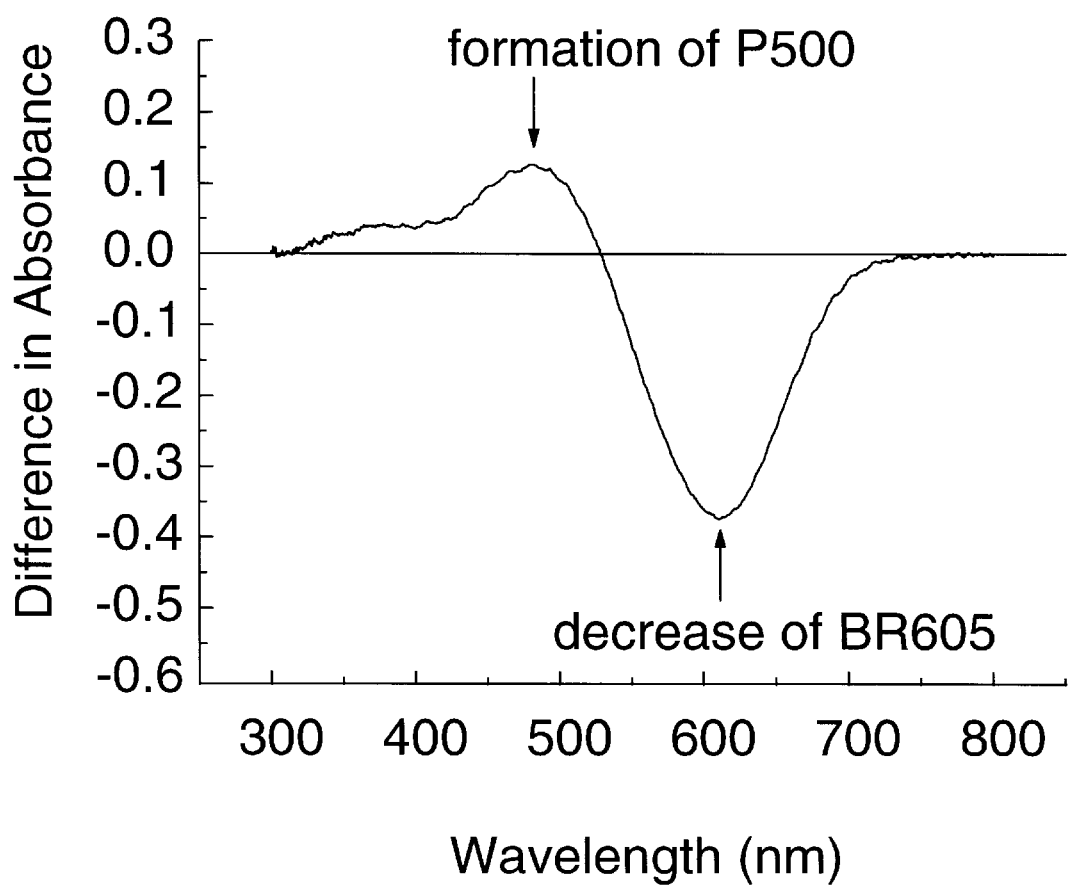

Next it was demonstrated that optical data in the form of a light-dark pattern can be stored in the bR film. The bR gel (layer II) was switched to the BR605 state by the application of DC voltage as noted above. The BR605 state was photo-induced to the P500 state by exposure to red light (645 nm wavelength) from a Krypton ion laser (Coherent, Innova 90) with an output power of 500 mW. The incident laser beam was expanded to 5 mm in diameter and portions of the bR film were selectively illuminated for one hour at 23° C. The change in the absorption spectrum of the red light-exposed regions of the bR film was measured with a spectrophotometer (Shimadzu, UV-2101PC) and is shown in FIGS. 6 and 7; FIG. 6 shows the adsorption spectrum after "bleaching" to the P500 state has commenced, while FIG. 7 shows the difference in adsorption after completion of the red light-induced "bleaching." The net result was that the BR605 state was selectively converted to the P500 state in the red light-exposed areas, that state being observable by a "bleached" or lighter appearance and absorption of light of 500 mm wavelength, thereby creating a two-dimensional image pattern of "bleached" gel against a blue background.

It was next demonstrated that the light-dark pattern recorded in the bR film by the laser could be fixed in the film by application of an electrical field. The polarity of the electrical field applied to the cell was reversed shortly after the photo-induction of the light-dark pattern in the bR film, which caused that region of the bR film that was not exposed to the red laser to switch from the blue BR605 state to the purple BR568 state. However, the P500 state bleached portions of the bR film stayed bleached, permitting the light-dark image in the bR film to remain after the polarity of the electrical field was switched.

Figure 8:
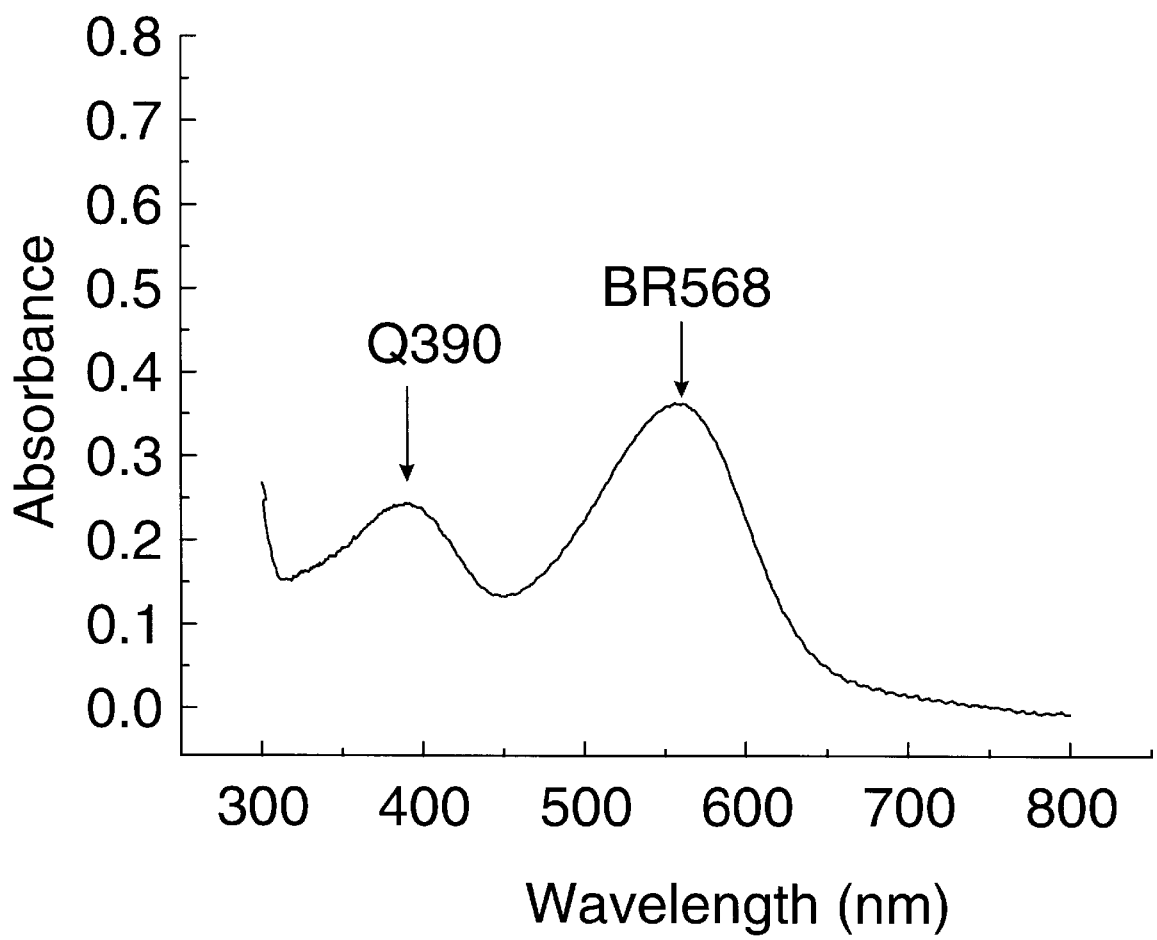

In the dark, the absorption spectrum of the laser-exposed region slowly changed from 500 nm (the P500 state) to 390 nm (the Q390 state), which enhanced the contrast between light and dark in the photo-induced pattern. Complete conversion of the P500 state to the Q390 state was achieved after 48 hours in the dark at 23° C., and the spectrum absorption transformation is shown under way in FIG. 8. Both the bleached and unbleached regions were then exposed to the same laser red light (645 nm). After one hour of exposure, no change was observed in the absorption spectra of the bleached (Q390) and the unbleached (BR568) regions, thus demonstrating that the light-dark image recorded in the bR film was fixed after the electrical field switching, and that red light can be used to read the recorded optical data without altering or erasing it.

Figure 9:
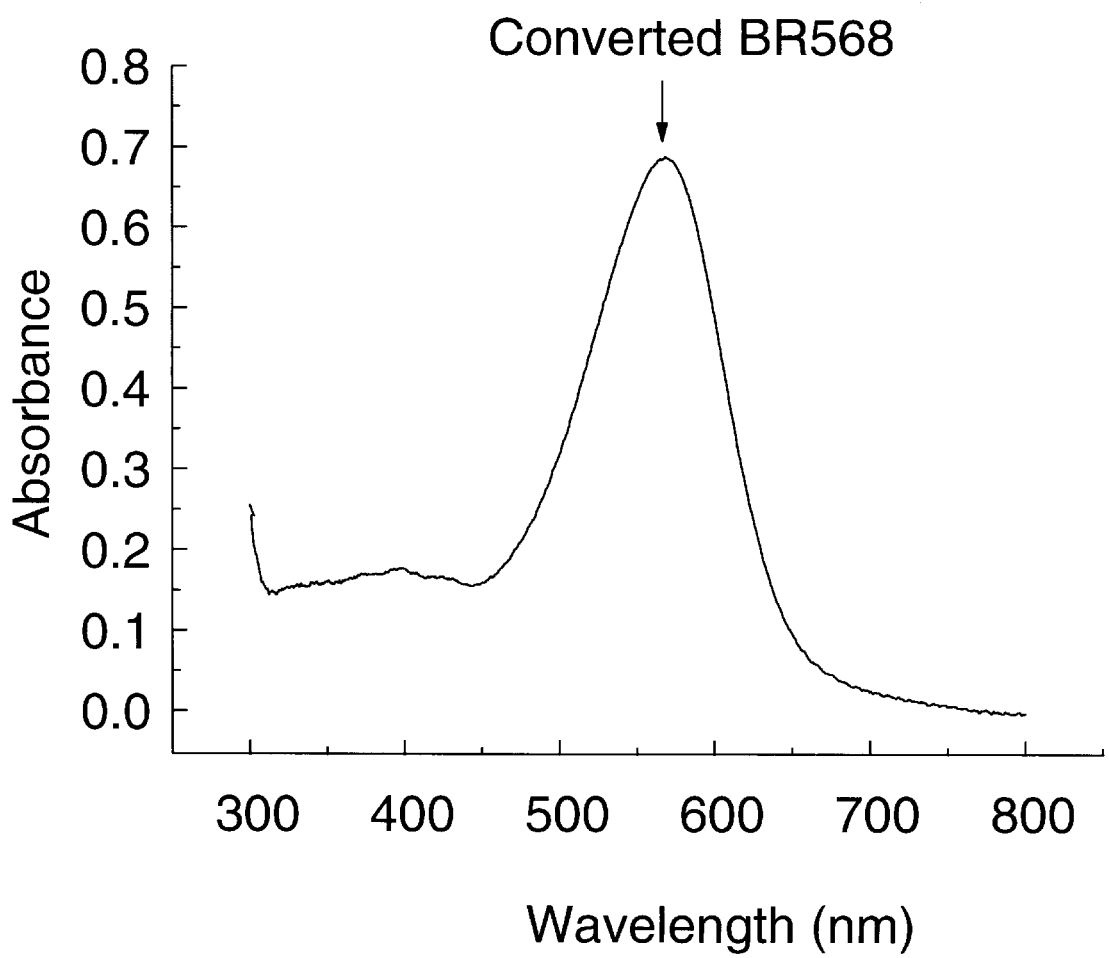

Finally, it was demonstrated that the light-dark pattern recorded in the bR film could be erased by exposure to blue light. A Mercury lamp (Bausch & Lomb SP-200) equipped with a Schott glass filter (Esco, 5-61P) with cutoff wavelength at 520 nm was used to provide blue light for photo-converting the bleached-out Q390 state back to the purple BR568 state. It was observed that shining blue light on those regions in the Q390 state for 20 minutes completely converted the Q390 state to the BR568 state; the absorption spectrum is shown in FIG. 9.

EXAMPLE 2

A test cell of substantially the same design used in Example 1 was used to conduct tests at two different pHs for conversion of the P500 state to the Q390 state at a cation concentration of 1 mM of $Ca^{+2}$, while maintaining the pH at 3, then at 7. It was found that conversion of the P500 state to the Q390 state at 23° C. only occurs at pH 7. At 23° C. and pH 3 the P500 state converts to a different state, Q380, with a peak absorbance at 380 nm. Both the Q390 state and the Q380 state are thermally stable. However, only the Q390 state can be photo-converted back to the BR568 state. Therefore, if erasure of optically recorded data is desired, switching to the BR568 state must be done before formation of the Q380 state, which occurs in 48 hours at room temperature and pH 3.

EXAMPLE 3

A test cell substantially the same design used in Example 1 was used to test for the effects of temperature. First, the effects of temperature on the formation of the P500 state were tested. The bR gel was switched to the blue BR605 state by application of substantially the same electrical field used in Example 1. Then the bR gel was exposed to red light (645 nm) to form a bleached pattern in the P500 state. After one hour of exposure, the bR gel was exposed to blue light to convert the P500 state pattern back to the BR605 state. The red and blue light exposures were conducted at 23° C. The resulting absorption spectrum of the so-converted BR605 state was compared to that of the initial BR605 state, and revealed that the peak absorbance had been decreased by 10%. The same conversions by light exposure and measurements were repeated at 2° C.; in this case it was found that the peak absorbance at 605 nm did not change.

Next, the effects of temperature on the formation of the Q390 state were tested by measuring the rate of decay of P500 at different temperatures. It was found that the rate of conversion from the P500 state to the Q390 state is temperature-dependent. Complete conversion to the Q390 state was obtained in four hours at 37° C. at pH 7 and 1 mM cation concentration. The conversion rate decreased as the temperature decreased, from four hours at 37° C. to 48 hours at 23° C.

EXAMPLE 4

A test cell of substantially the same design used in Example 1 was used for measuring the switching voltage and time as a function of cation concentration in the gel. It was found that a relatively low concentration ($\leq 100$ $\mu$M, $Ca^{+2}$) required a higher DC voltage (>50 V) and longer switching time. Low concentration also caused the non-uniform conversion between the BR568 and the BR605 states in the bR gel. On the other hand, a much higher ion concentration ($\geq 10$ mM, $Ca^{+2}$) caused the bR gel to turn orange at the cathode side. This orange region could not be converted back to the original BR568 state nor could light-dark patterns be recorded in it, leading to the conclusion that the ideal cation concentration is within the range >100 $\mu$M but <10 mM.

EXAMPLE 5

A test cell of substantially the same design used in Example 1 was used to measure the fraction of the bR hydrogel layer converted from the BR568 to the BR605 state with no buffer layers (layers I and III). It was found that applying an electric field to a bR polyacrylamide gel without the buffer layers I and III converted only half of the bR in the gel from the BR568 state to the BR605 state.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method of storing and retrieving optical data comprising the steps:
   (a) providing a film comprising an agent selected from the group consisting of bacteriorhodopsin and bacteriorhodopsin mutants in a conductive polymeric matrix;
   (b) converting the retinal component in said film from a purple membrane state that absorbs light centered at approximately 568 nm to a blue membrane state that absorbs light centered at approximately 605 nm by the application of DC voltage to said film;
   (c) exposing said film to red light in a predetermined pattern to selectively convert portions of said film to the P500 state so as to record optical data therein;
   (d) storing said recorded optical data in said film by causing the retinal component of said bacteriorhodopsin in said film to go to a purple membrane state that absorbs light centered at approximately 568 nm by reversing the polarity of the DC voltage applied in step (b); and
   (e) retrieving said fixed optical data by exposing said film of step (d) to red light and optically detecting said optical data.

2. The method of claim 1 wherein the detecting of step (e) is conducted by an optical recording device.

3. The method of claim 2 wherein said optical recording device is a video camera.

4. The method of claim 3 wherein said video camera is a coupled charge device.

5. The method of claim 1, including an erasure step (f) comprising exposure of said fixed optical data in said film to blue light sufficient to erase said fixed optical data and to convert the retinal component in said bacteriorhodopsin in said film back to a purple membrane state that absorbs light centered at approximately 568 nm.

6. The method of claim 1 wherein said polymer matrix is a hydrogel.

7. The method of claim 6 wherein said hydrogel comprises polyacrylamide.

8. The method of claim 7 wherein said agent is present in an amount of at least 0.001 wt %.

9. The method of claim 1 wherein, instead of application of a DC voltage, step (b) is conducted by lowering the pH of said film.

10. The method of claim 9 wherein, instead of application of a DC voltage of reverse polarity, step (d) is conducted by raising the pH of said film.

11. The method of claim 1 wherein, instead of application of a DC voltage, step (b) is conducted by deionization of said film.

12. The method of claim 11 wherein, instead of application of a DC voltage of reverse polarity, step (d) is conducted by ionization of said film.

13. The method of claim 1 wherein said DC voltage of steps (b) and (d) is from 3 to 30 V with a current from 0.1 to 1.0 mA.

14. The method of claim 1 wherein the source of said red light of steps (d) and (e) is a laser.

15. The method of claim 5 wherein the source of said blue light of step (f) is a mercury lamp.

16. The method of claim 1 wherein the film of step (a) is in a hydrogel layer between two additional hydrogel layers and all three hydrogel layers are rendered conductive by absorption of ions from an aqueous ionic solution.

17. The method of claim 16 wherein all three hydrogel layers comprise polyacrylamide having an ionic strength of from 0.1 to 10 mM.

18. Apparatus for storing, retrieving and erasing optical data comprising:
   (a) a three-layered conductive hydrogel composite comprising one carrier layer containing an agent selected from the group consisting of bacteriorhodopsin and bacteriorhodopsin mutants, said one carrier layer being interposed between two electrode hydrogel layers;
   (b) a DC power supply;
   (c) electrodes connected to said DC power supply and to said two electrode hydrogel layers;
   (d) a source of red light for recording optical data in said carrier layer;
   (e) an electrical switch interposed between said DC power supply and said electrode hydrogel layers for reversing the polarity of said DC power supply; and
   (f) an associated source of blue light for erasing optical data recorded in said carrier layer.

19. Apparatus of claim 18 wherein the concentration of said agent in said carrier layer is at least 0.001 wt %.

20. Apparatus of claim 18 wherein the hydrogel of each of said three layers comprises polyacrylamide rendered conductive by absorption of ions from an aqueous ionic solution having an ion concentration of from 0.1 to 10 mM.

21. Apparatus of claim 18 wherein the source of red light is a laser.

22. Apparatus of claim 18 wherein the source of blue light is a mercury lamp.

23. The method of claim 1 including causing those portions of the film selectively converted to the P500 state in step (c) to decay to the Q390 state by maintaining said film in darkness.

* * * * *

UNITED STATES PATENT AND TRADEMARK OFFICE
CERTIFICATE OF CORRECTION

PATENT NO. : 5,825,725
DATED : October 20, 1998
INVENTOR(S) : Rayfield, Hsu

It is certified that error appears in the above-indentified patent and that said Letters Patent is hereby corrected as shown below:

Col. 2, line 51: change "tetraamethylethylenediamine" to read -- tetramethylethylenediamine --

Signed and Sealed this

Twenty-seventh Day of July, 1999

Attest:

Q. TODD DICKINSON

*Attesting Officer*   Acting Commissioner of Patents and Trademarks